3,087,853
WATER SOLUBLE COMPOSITIONS CONSISTING ESSENTIALLY OF IODINE AND A WATER SOLUBLE OXYGEN CONTAINING POLYMER

William A. Hosmer, Lee, Mass., and Albert C. Starke, Jr., Easton, Pa., assignors to General Aniline & Film Corporation, New York, N.Y., a corporation of Delaware
No Drawing. Filed July 2, 1956, Ser. No. 595,109
5 Claims. (Cl. 167—17)

The invention here presented is a water-soluble composition of elemental iodine with oxygenated cellulosic and condensation resins in which the iodine is, in large part, denatured of its poisonous and irritating character, while retaining its antiseptic and disinfecting properties in a low priced composition.

Iodine is one of the more important antiseptics; the toxity thereof is considerably lower than that of "bichloride" of mercury; it is less corrosive than phenol, relatively inodorous as compared to formaldehyde and it has many advantages over most of the common antiseptics and disinfectants, except for the fact that its solubility in water is very low, and it is rather strongly irritating to living tissues. The use of polyvinylpyrrolidone has been suggested as an iodine carrier, but it does not fully meet the requirements as a disinfestant or reactant.

It has now been found that iodine can be associated with, or complexed into, various water soluble polymeric substances, and when so associated, the major portion of the iodine remains available as an antiseptic. A small portion of the admixed iodine enters into chemical combination with the polymer molecule, but the remainder is absorbed or adsorbed in such a way that the irritant properties of the iodine, per se, are removed; yet the bactericidal, antiseptic and disinfecting powers of the iodine component remains substantially unchanged. Accordingly the material may be used in water solution as a powerful but non-irritating and long lasting antiseptic, disinfectant, and the like. The utility of this preparation is not however limited to medicinal or bacteriological uses, as above set out, but it is also useful for such purposes as iodometric titrations in which it is substantially superior to any of the other iodine carriers; and also as a mild, water borne, oxidizing agent for use where the mildest possible oxidizing action is desired, in water solution.

Other objects and details of the invention will be apparent from the following description.

The primary component of the composition is, of course, elemental iodine, or an interhalogen such as iodine-chloride and iodine-bromide. The carrier then is a relatively high molecular weight polymer, characterized by water solubility and the presence of oxygen in the copolymer material. The preferred copolymers are such substances as maleic anhydride-vinyl copolymer of U.S.P. 2,047,398, carboxycellulose, methylcellulose and dimethylhydantoin formaldehyde, the free acids and alkali metal salts of maleic anhydride vinyl copolymers, and the like. It may be noted that the polyvinylpyrrolidone above mentioned is a nitrogen containing compound in which the nitrogen occurs in the tri-valent condition, and it seems highly probable that the iodine absorbed into that compound is held by the two remaining secondary valences. In sharp contrast, most of the compounds of the present invention contain no nitrogen and no secondary valences to hold the iodine and, accordingly, it appears highly probable, that the iodine is held by an adsorption action of some sort in the interstices of the molecule. It appears to be of the essence, however, that these polymers shall contain a substantial amount of oxygen.

The composition of the present invention may be prepared by either one of two different processes. The dry polymer may be milled with elemental iodine until the iodine is thoroughly dispersed into the polymer. This composition keeps indefinitely and the major portion of the iodine remains available for antiseptic and disinfecting purposes. A very small amount is combined into the molecule but this amount is small enough to be negligible. Also there is an upper limit to the amount of iodine which can be added to the solid polymer. The polymer so prepared is then soluble in water and contains sufficient iodine to give an amount of available iodine of approximately 1–10 percent.

Thus the polymer and iodine in pulverized form may be inserted into a roller mill and mixed by rolling in a glass bottle until a thoroughly homogeneous mixture is obtained. This usually requires some hours. Alternatively the two may be ground together in a mortar and pestle or in a ball mill or in almost any other desired mixing device, the more vigorous the mixing action, the sooner the compound is prepared. It may be noted that at room temperature iodine shows a definite vapor pressure which results in a rapid diffusion of the iodine through the polymer.

Alternatively the polymer may be dissolved in water or other suitable solvent for the polymer and the elemental iodine per se or in solution, added preferably with vigorous stirring. The interaction starts at once, as is shown by the immediate reddening of the solution, but the completion of the preparation requires a considerably longer time than the mixing in the solid form. If desired, the water or solvent may then be evaporated from the solution and the composition recovered in the dry state.

The amount of iodine which will be incorporated in the polymer will depend on the concentration of iodine desired in the final product. Compositions having active germicidal properties have been obtained when from 1–25 percent of iodine by weight of the polymer was employed. It has been found that in the aqueous solutions of the oxygenated cellulosic and condensation resins and iodine, the iodine is present in two forms, one, as available iodine which may be determined directly by titrating the aqueous solution of the material with 0.1-N sodium thiosulfate ($Na_2S_2O_3$), and the other as iodide ion which may be determined by reducing the iodine compound in solution with 1-N-sodium acid sulfite ($NaHSO_3$), sufficient being added to make the solution colorless, 0.1-N silver nitrate is then added along with sufficient nitric acid to make the solution acidic and it is then back-titrated with ammonium thiocyanate ($NH_4SCN$); the iodide ion is the difference between this figure and the available iodine as determined above.

The details of the present invention will be apparent from the following specific examples, the parts are by weight:

Example 1

A methyl vinyl ether-maleic anhydride copolymer obtained by the copolymerization of equimolar amounts of methyl vinyl ether and maleic anhydride, as disclosed in U.S.P. 2,047,398, was mixed with 1 part of crystalline iodine per 4 parts by weight of polymer by placing the material in a jar and rolling it on a roller mill at room temperature. In the course of several hours, a thoroughly homogeneous composition of polymer and iodine was obtained which was found to be readily soluble in water to yield an excellent iodizing solution suitable for use as an antiseptic, as a titration material for analysis, for use in a wet dressing on wounds; it is useful as a component in various skin fresheners and the like, and is useful as a water soluble supply of iodine for such chemical reactions as the introduction of iodine into dyestuffs and the like.

Example 2

4 parts by weight of sodium carboxymethyl cellulose were mixed in the dry with 1 part by weight of elemental iodine, the materials introduced into a jar which was then closed and placed on the roller mill at room temperature. After several hours of rolling, the material was found to be a thoroughly homogeneous mixture; the iodine having diffused through the polymer to yield a red-brown homogeneous polymerized material. This material was in general useful for the same purposes as the material prepared in Example 1, and it was found to be soluble in water in the same proportions as the sodium carboxymethyl cellulose alone.

Example 3

Similarly 4 parts of a styrene-maleic anhydride copolymer were added and 1 part of elemental iodine, the material bottled and rolled as in the two preceding examples for several hours on the roller mill. As in Examples 1 and 2 a thoroughly homogeneous red-brown product in granular form was obtained, which was useful for the same purposes as the material produced in Example 1 and was found to be soluble in water in the same proportion in which the styrene-maleic anhydride copolymer was soluble.

Example 4

5 parts by weight of methyl cellulose (obtained under the trade name "Methocel" from the Dow Chemical Company) were dissolved in 95 parts by weight of water and 1 part of elemental iodine was added to the water solution. The iodine, which is normally practically wholly insoluble in water, began to dissolve immediately, as shown by a coloring of the solution of polymer. The mixture was stirred vigorously for several hours and the iodine was found to dissolve completely in the water solution of polymer. This water solution was useful for the purposes shown in Example 1, and the solution could be diluted indefinitely with additional quantities of water without precipitation of the iodine. A portion of the water solution was then evaporated under vacuum at a temperature very slightly above room temperature and the product was carried down to dryings. Practically none of the iodine was lost by this procedure, in view of its complete insolubility in water vapor.

Example 5

5 parts by weight of a melamine-formaldehyde resin (obtained under the trade name "Melmac" from the American Cyanamid Company) were dissolved in 95 parts by weight of water and to this solution there was then added 1 part by weight of elemental iodine. The solution of the iodine began at once, as in Example 4, and after several hours of vigorous stirring the iodine was completely dissolved. The chemical and physical properties of the solution were very much the same as those shown in Example 4 and similar uses were made of this solution.

Example 6

4 parts by weight of urea-formaldehyde resin (obtained under the trade name "Urac 180" from American Cyanamid Company) were dissolved in 95 parts by weight of water, to which there was then added 1 part by weight of iodine. As in Examples 4 and 5, solution began at once, as shown by the reddening of the solution, and vigorous stirring over a substantial length of time resulted in complete solution of the iodine. This solution had physical and chemical properties very much like those of the previous examples.

Example 7

All 3 of the substances of Examples 4, 5 and 6 were also tested for the formation of the desired compound in the dry by blending one part of crystalline iodine and 5 parts of each of the powdered resins in a closed glass container on a roller mill. Brown colored solids which were water soluble resulted quickly. The aqueous solutions of these polymer-iodine compositions were identical with the aqueous solutions obtained by adding iodine to an aqueous solution of the same polymer.

A ten percent aqueous solution of dimethylhydantoin formaldehyde was mixed with iodine until a brown-red solution developed. The aqueous solution was decanted from precipitated iodine and 0.11 percent iodide ion. This solution could be further diluted with water without precipitation of iodine.

Example 8

5 parts by weight of carboxymethyl cellulose were placed in a bottle along with 1 part of iodine and the material rolled on the roller mill until a homogeneous material was obtained. This also was water soluble and carried the iodine into solution with it in the same way as in the prior examples and was useful for similar purposes.

Example 9

5 parts of carboxymethyl cellulose was mixed with 1 part of elemental iodine on the roller mill, as in Example 8, to obtain a homogeneous composition. 20 parts of a good grade of soap were then melted and 6 parts of the carboxymethyl cellulose-iodine were stirred into the melted soap until a thoroughly homogeneous mixture was obtained. This material was found to be a very excellent germicidal soap.

Each of the thus formed products can be used as a powder having bactericidal properties and aqueous solutions either alone or mixed with surface active agents can be employed as a bactericidal wash. In addition, aqueous solutions of the water soluble complexes of iodine and oxygenated polymers may be applied as a bactericidal wash or spray to floors, walls, etc., and on drying left a bactericidal coating thereon.

Thus the invention provides a composition of matter containing a water-soluble oxygen containing polymer having adsorbed thereinto a substantial amount of elemental iodine, a major proportion of which remains free for antiseptic, bacteriological and disinfecting uses.

While there are above disclosed but a limited number of embodiments of the process of the invention it is possible to provide still other embodiments without departing from the inventive concept herein disclosed, and it is therefore desired that only such limitations be imposed upon the appended claims as are stated therein or required by the prior art.

The invention claimed is:

1. A water-soluble dry composition of matter having a red-brown color consisting essentially of the combination of a major amount of from 99 to 75% of a water-soluble oxygen containing polymer selected from the group consisting of methyl vinyl ether-maleic anhydride copolymers, styrene-maleic anhydride copolymers, carboxymethyl cellulose, methyl cellulose, melamine formaldehyde resins, urea formaldehyde resins, dimethylhydantoin formaldehyde resins having thoroughly dispersed therein a minor amount of from 1 to 25% elemental iodine.

2. A water-soluble dry composition of matter having a red-brown color consisting essentially of the combination of a major amount of from about 99 to 75% of a water-soluble methyl vinyl ether-maleic anhydride copolymer having thoroughly dispersed therein a minor amount of about 1 to 25% of elemental iodine.

3. A water-soluble dry composition of matter having a red-brown color consisting essentially of the combination of a major amount of from about 99 to 75% of a water-soluble methyl cellulose having thoroughly dispersed therein a minor amount of about 1 to 25% of elemental iodine.

4. A water-soluble dry composition of matter having a red-brown color consisting essentially of the combination of a major amount of from about 99 to 75% of a water-soluble dimethylhydantoin formaldehyde having thoroughly dispersed therein a minor amount of about 1 to 25% of elemental iodine.

5. A water-soluble dry composition of matter having a red-brown color consisting essentially of the combination of a major amount of from about 99 to 75% of a water-soluble carboxymethylcellulose, and having thoroughly dispersed therein a minor amount of about 1 to 25% of elemental iodine.

References Cited in the file of this patent

UNITED STATES PATENTS

| | | |
|---|---|---|
| 2,550,622 | Taub | Apr. 24, 1951 |
| 2,706,701 | Beller et al. | Apr. 19, 1955 |
| 2,752,281 | Niederhauser | June 26, 1956 |
| 2,758,049 | Dienna | Aug. 7, 1956 |
| 2,826,528 | Shelanski | Mar. 11, 1958 |

OTHER REFERENCES

West: Journal of Chem. Physics, 1947, page 689.